United States Patent [19]
Gautier

[11] Patent Number: 5,906,567
[45] Date of Patent: May 25, 1999

[54] ROLLER ASSEMBLY FOR THE TRANSPORTATION OF ARTICLES AT HIGH TEMPERATURES

[75] Inventor: David Gautier, Feignies, France

[73] Assignee: Vesuvius France S.A., Feingies, France

[21] Appl. No.: 08/836,549

[22] PCT Filed: Oct. 9, 1995

[86] PCT No.: PCT/FR95/01312

§ 371 Date: Jul. 28, 1997

§ 102(e) Date: Jul. 28, 1997

[87] PCT Pub. No.: WO96/13691

PCT Pub. Date: May 9, 1996

[30] Foreign Application Priority Data

Oct. 31, 1994 [FR] France .................................. 94 13345

[51] Int. Cl.$^6$ ....................................................... B23P 15/00
[52] U.S. Cl. .................................. 492/16; 492/42; 492/47
[58] Field of Search ................................. 492/47, 45, 42, 492/16; 198/780; 65/253, 374.13, 370.1; 432/246; 271/264

[56] References Cited

U.S. PATENT DOCUMENTS

| | | | |
|---|---|---|---|
| 4,343,395 | 8/1982 | Lippert et al. ........................... | 198/781 |
| 4,399,598 | 8/1983 | Page et al. ............................... | 432/246 |
| 4,404,011 | 9/1983 | McMaster ................................. | 65/253 |
| 4,459,148 | 7/1984 | Diederen et al. ........................ | 65/348 |
| 4,751,776 | 6/1988 | Reunamäki ............................... | 492/47 |
| 4,925,014 | 5/1990 | Haite ....................................... | 198/780 |
| 4,952,782 | 8/1990 | Yokokawa et al. ...................... | 492/47 |
| 5,048,168 | 9/1991 | Vanaschen et al. ..................... | 492/47 |
| 5,146,675 | 9/1992 | Ford et al. . | |
| 5,370,596 | 12/1994 | Compagnon ............................. | 492/47 |
| 5,461,464 | 10/1995 | Swain ...................................... | 492/47 |
| 5,469,619 | 11/1995 | Renek ..................................... | 492/47 |
| 5,576,803 | 11/1996 | Williams et al. ........................ | 492/47 |
| 5,649,891 | 7/1997 | Kass et al. .............................. | 492/47 |
| 5,722,924 | 3/1998 | Hill et al. ................................. | 492/47 |

*Primary Examiner*—I. Cuda
*Attorney, Agent, or Firm*—Arthur L. Plevy

[57] ABSTRACT

A roller assembly for the high-temperature transport of articles, including a ceramic roller with a longitudinal axis and two ends; at least one generally cylindrical metal end cap at one or both ends of the roller, and means arranged between the roller end and the end cap for rotationally interconnecting the end cap and the roller (2), axially securing the end cap (4) to the roller (2), and centring the roller (2) relative to the end cap (4). The means (10) for centring the roller relative to the end cap (4) are separate from the means (12) for rotationally interconnecting the end cap and the roller (2) and for axially securing the end cap (4) to the roller (2). The means (10) for centring the roller relative to the end cap (4) may consist of bimetallic members (14) or longitudinal or radial resilient members (16).

12 Claims, 3 Drawing Sheets

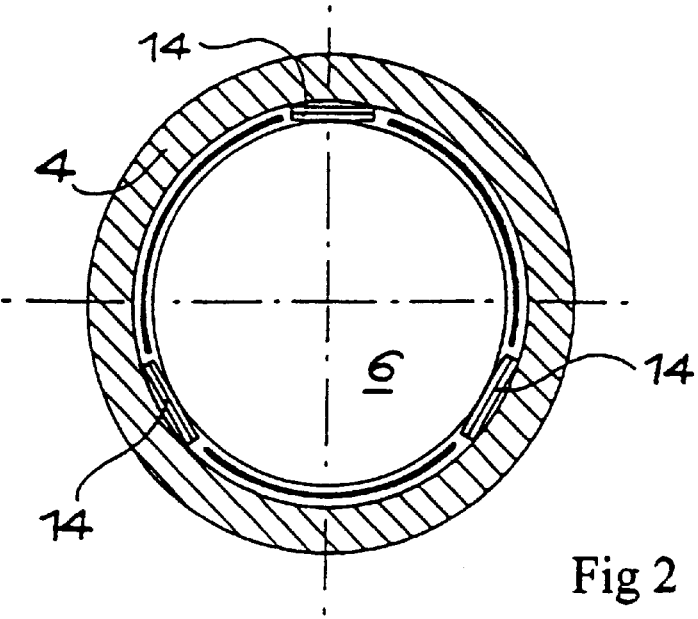
Fig 2
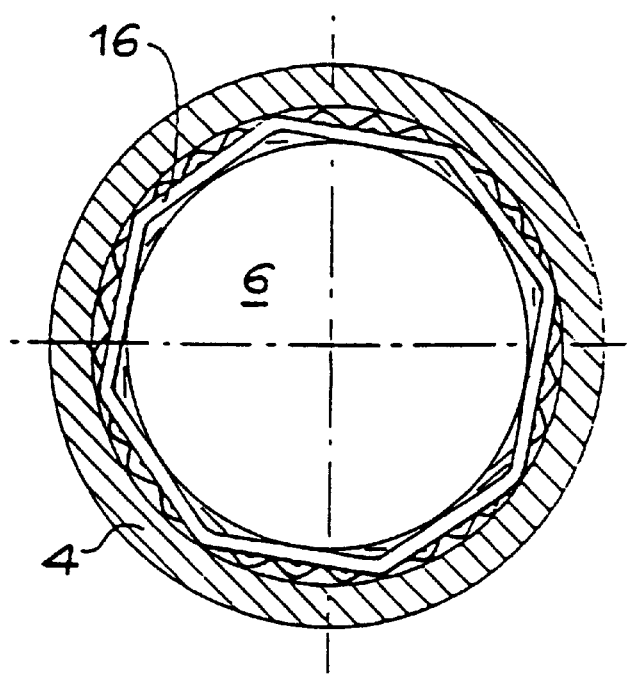 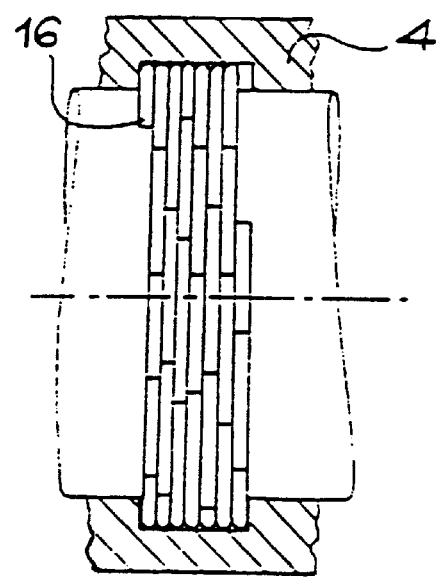
Fig 3A            Fig 3 B

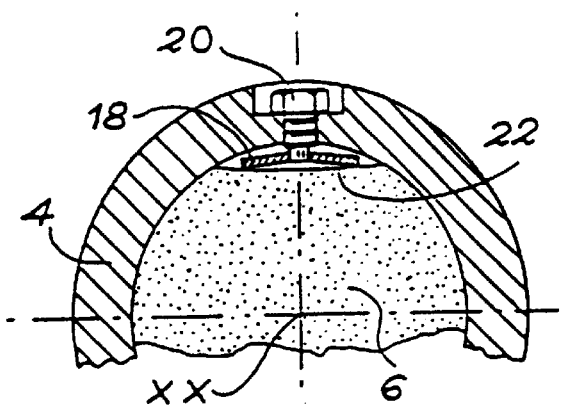
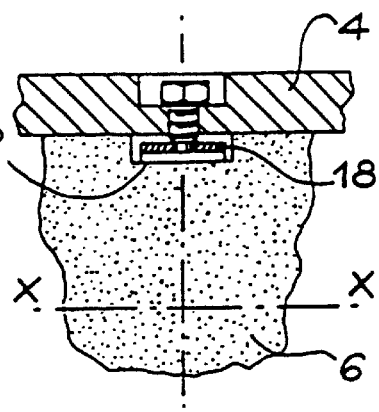
Fig 4A  Fig 4B
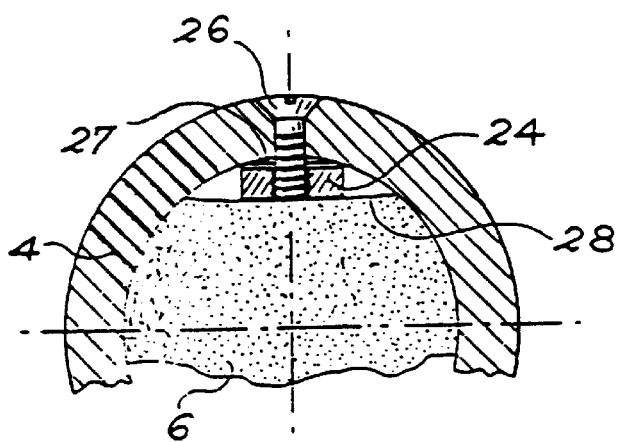
Fig 5
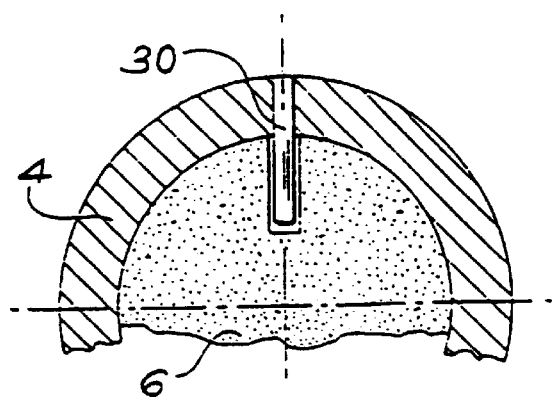
Fig 6

ROLLER ASSEMBLY FOR THE TRANSPORTATION OF ARTICLES AT HIGH TEMPERATURES

The invention relates to a roller assembly for transporting articles at high temperatures.

More specifically, it relates to a roller assembly for transporting articles at high temperatures comprising:
- a ceramic roller having a longitudinal spindle and two ends;
- at least one generally cylindrical, metallic cap, end piece or fitting, fitted at at least one end of the roller;
- means, interposed between the end of the roller and the fitting, in order to link in rotation said fitting and said roller, so as to axially retain the fitting with respect to the roller and for centring the roller with respect of the fitting.

Installations for the annealing or tempering of glass or the conveying of sheets comprise a conveyor, in which roller assemblies convey articles such as glass or metal sheets. These roller assemblies are generally constituted by a roller, e.g. of molten silica, and two metal fittings mounted at each of the roller ends. The fittings are rotated by a transmission mechanism forming part of the conveyor, e.g. by means of chains or gears.

It is important to ensure an effective rotary link between the fittings and the roller. Thus, any sliding of the roller with respect to the fitting leads to a marking of the articles. Moreover, said link must be ensured at high temperatures up to 700° C. Such a temperature causes differential expansion problems between the roller and the metal fitting, whose expansion is much greater.

In order to compensate this expansion, use has already been made of elastic elements. For example, U.S. Pat. No. 4,404,011 describes spring leaves and U.S. Pat. No. 4,399,598 describes split elastic rings. However, with such a solution, the transmission of a torque between the roller and the fitting is brought about by friction. However, the modulus of elasticity and the locking of the elastic elements drops at the temperature of use. Therefore the torque transmission does not take place correctly. According to another solution known from EP 615 960, use is made of bimetallic elements, whose camber increases at the same time as the temperature. Thus, there is a partial compensation of the drop in the characteristics of the materials at high temperatures. However, here again, the torque transmission between the roller and the fitting by friction is not correctly ensured.

U.S. Pat. No. 5,146,675 discloses roller assemblies in which the link between the roller and the fitting is ensured by a key on flat. This means permits an effective rotation linking. The fitting is also well axially retained and cannot be disengaged from the roller. However, the centring of the roller with respect to the fittings is very mediocre due to the annular space appearing at high temperature, due to the differential thermal expansion of the fitting, a clearance appears between the key and the flat. Therefore the fitting turns slightly with respect to the roller until the edge of the key again comes into contact with the flat. When the roller cools, the fitting reassumes its initial dimensions and the key exerts on the rollers stresses which may break it.

It is also known from the document FR-2 550 172 a roller, each end of which is provided with a metallic fitting. A metallic ring, having an expansion coefficient greater than the one of the fitting, is interposed between the latter and the end of the roller. The extremity of the roller is linked for rotation with the fitting by means of a key.

However, in this linkage, the ring has a thickness which is not important in comparison with the diameter of the fitting. In order to compensate for the difference of expansion between the fitting and the roller, it would consequently be necessary that the metal in which the ring is made, has a coefficient of expansion several tenth of times greater than the one of the fitting, which is practically impossible.

On another side, as far as the key is concerned, a drawback similar to the one existing in the case of the document U.S. Pat. No. 5,146,675 is to be noted. At high temperature, a play will appear between the key and the flat with the risk to break the roller when it returns the ambient temperature.

The present invention relates to a roller assembly obviating the disadvantages of the prior art. It must permit both the effective centring and driving of the roller by the fittings, whilst also axially retaining the fitting with respect to the roller.

These aims are achieved as a result of the fact that the means for linking the fitting and the roller in rotation and for axially retaining the fitting with respect to the roller are able to compensate the differential thermal expansion of the fitting with respect to the roller at said high temperature, and due to the fact that said means are separate and independent of the means for centring the roller with respect to the fitting.

As a result of this characteristic, the centring of the roller relative to the fitting can be ensured by elastic elements, e.g. spring leaves or bimetallic elements. These elements do not ensure the torque transmission. It is therefore unnecessary to await a high contact pressure between the elements and the roller end on the one hand and between the elements and the fitting on the other. This is due to the fact that the weight of the roller and the load which it supports are not very great. Therefore the radial forces necessary for the centring are not very high, about ten to twenty times lower than the forces necessary for ensuring the rotation of the roller by friction only. Therefore, despite the high temperature and the reduction in the modulus of elasticity resulting therefrom, effective centring is still possible.

The fact that the driving means are able to compensate the expansion of the fitting prevents a relative rotation of the fitting with respect to the roller at high temperatures. Thus, there is an elimination of the risk of destruction of the roller when the fitting reassumes its initial temperature.

According to a variant the means for centring the roller relative to the fitting are constituted by longitudinal or radial, bimetallic elements.

According to a second variant the means for centring the roller relative to the fitting are constituted by longitudinal or radial, elastic elements.

According to another variant the means for linking in rotation the fitting and the roller and for axially retaining the fitting with respect to the roller are constituted by a bimetallic leaf fixed to the fitting and applied to a flat of the end of the roller.

According to yet another variant the means for linking in rotation the fitting and the roller and for axially retaining the fitting with respect to the roller are constituted by a key fixed to the fitting and applied by an elastic means to a flat on the end of the roller.

Finally, according to another variant, the means for linking in rotation the fitting and the roller and for axially retaining the fitting with respect to the roller are constituted by a pin penetrating a recess in the end of the roller.

Other features of the invention can be gathered from the following description of non-limitative embodiments with reference to the attached drawings, wherein:

FIG. 2 shows a detail view of the first variant of the centring means;

FIG. 3 shows a detail view of the second variant of the centring means;

FIG. 4 shows a detail view of a first variant of the means for linking in rotation the roller and the fitting;

FIG. 5 shows a detail view of a second variant of the means for linking in rotation the roller and the fitting;

FIG. 6 shows a detail view of a third variant of the means for linking in rotation the roller and the fitting.

Figure 1:
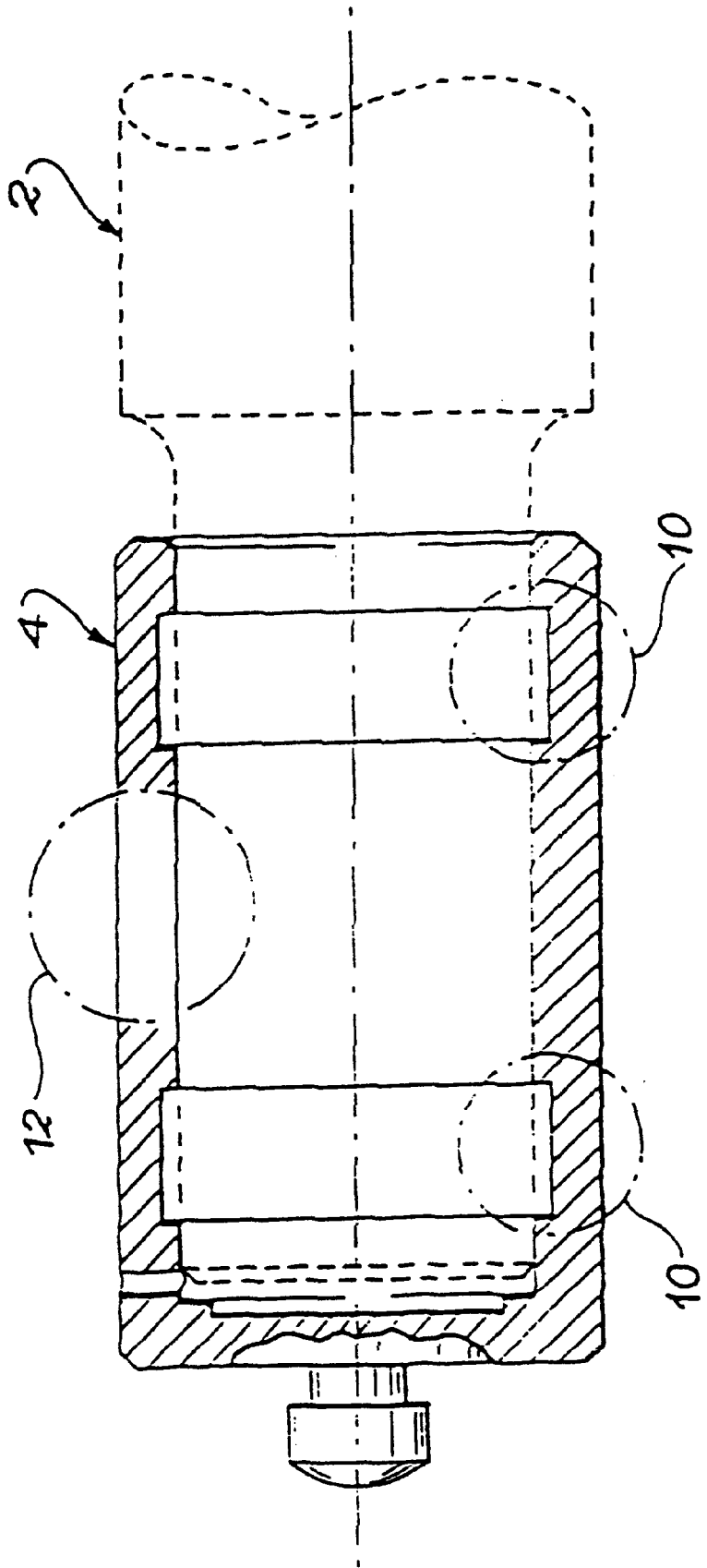
FIG. 1 shows a view of the end of a roller assembly according to the invention.

The roller assembly shown in FIG. 1 is constituted on the one hand by a ceramic and in general vitreous silica roller 2 and two metal caps, end pieces or fittings 4, fitted at each of the ends of the roller 2. Only one fitting 4 is shown in FIG. 1.

The roller 2 has a cylindrical portion on which is transported a load, e.g. glass sheets, and two small diameter ends 6 on which are mounted the fittings 4. The roller 2 is mounted so as to rotate in conventional manner about its longitudinal axis X—X Centring means 10 are disposed between the fitting 4 and the end 6 of the roller 2. Means 12 for linking in rotation the roller 2 and the fitting 4 are also provided. The centring means 10 are separate and independent of the means linking in rotation the roller 2 and the fitting 4, as can be gathered from FIG. 1.

FIG. 2 shows a first variant of the centring means. They are constituted by three bimetallic elements 14 arranged circumferentially around the end of the roller 2 at 120° from one another. These elements are made from two metals having different thermal expansion coefficients. Their curvature increases with the temperature, which makes it possible to compensate the differential expansion of the fitting 4 and the roller 2. Bimetallic elements of this type are described in EP 574 278. Spacers 15 separate the elements 14.

FIG. 3 shows a second variant of the centring means. They are constituted by helical springs 16 identical to those described in EP 615 960.

FIG. 4 shows a variant of the means for rotating the roller 2 by the fitting 4. A leaf 18 is fixed by a screw 20 to the fitting 4. The leaf 18 can be elastic or bimetallic. It is applied to a flat 22 formed on the end of the roller 2. Thus, the leaf ensures the linking in rotation of the fitting 4 and the roller 2. Moreover, the width of the flat corresponds to that of the leaf in such a way that the fitting 4 is blocked in the direction X—X of the longitudinal axis of the roller 2. Thus, the leaf simultaneously fulfils two functions. The elasticity of the leaf 18 makes it possible to compensate the expansion of the fitting in such a way that its ends remain applied to the flat 22, even at high temperature.

FIG. 5 shows a second variant of the means for rotating the roller 2 by the fitting 4. A key 24 is retained in rotation by a spindle 26 screwed into the fitting. The key can slide freely on the spindle 26. A spring washer or a spring 27 is placed between the fitting and the key. The spring washer makes it possible to adapt to the differential expansion of the fitting. In a similar way to what was described in conjunction with FIG. 4, the key is applied to a flat or an inwardly curved surface 28 of the end 6 of the roller 2. The key is also longitudinally locked so as to immobilise the fitting 4 relative to the roller 2.

FIG. 6 shows a third variant of the means for driving the roller 2 by the fitting 4. A simple pin 30, e.g. an expansion pin, fulfils the two functions of linking in rotation and linking in direction X—X.

When the fitting expands, the pin remains engaged in the roller, so that there is no rotation of the fitting which respect to the roller.

Thus, in the invention, unlike in the known devices, the centring means shown in FIGS. 2 and 3 only ensure the centring of the fitting 4 relative to the roller 2. The functions of linking in rotation and linking in direction X—X are independently ensured by another, independent means, e.g. those described in a purely illustrative and in no way limitative manner with reference to FIGS. 4 to 6. Due to the fact that the centring means of FIGS. 2 and 3 (or other centring means) only have to fulfil the centring function, the drop in the modulus of elasticity of material at high temperature is not prejudicial because, as has been explained hereinbefore, the weight of the roller and the load which it supports are not very high. Therefore the radial forces for centring are not very high, namely approximately ten to twenty times lower than the forces required for rotating the roller 2. For example, a radial force of 5 kg is adequate for centring a roller for which a force of 100 kg would be necessary if it was also wished to drive the roller 2 solely by friction forces.

It is also pointed out that in all the embodiments described, the locking in rotation and translation in accordance with the axis of the roller are not ensured by friction forces, but instead by supports on surfaces inclined with respect to a circle centred on the axis of the roller and passing through the contact point of the roller and the rotation locking means.

I claim:

1. A roller assembly for transporting articles at high temperatures comprising:

a ceramic roller having a longitudinal spindle and two ends;

at least one generally cylindrical, metallic fitting mounted to at least one end of the roller, at least one end of the roller including a planar surface;

means for linking in rotation the fitting and the roller, for axially retaining the fitting with respect to the roller; and means for centring the roller relative to the fitting, the means for linking in rotation the fitting and the roller and for axially retaining the fitting with respect to the roller being separate and independent of the means for centering the roller relative to the fitting, said means for linking being able to compensate the differential thermal expansion of the fitting with respect to the roller at said high temperature, wherein said means for linking in rotation the fitting and the roller and for axially retaining the fitting with respect to the roller consist of a bimetallic, elastic leaf fixed to the fitting and applied to said planar surface on said at least one end of said roller.

2. The roller assembly according to claim 1, wherein the planar surface has a width corresponding to that of the elastic leaf.

3. A roller assembly according to claim 1, wherein the means for centring the roller relative to the fitting consist of longitudinal or radial bimetallic elements.

4. A roller assembly according to claim 1, wherein the means for centring the roller relative to the fitting consist of longitudinal or radial elastic elements.

5. A roller assembly for transporting articles at high temperatures, comprising:

a ceramic roller having a longitudinal spindle and two ends;

at least one generally cylindrical, metallic fitting, mounted to at least one end of the roller;

means for linking in rotation the fitting and the roller for axially retaining the fitting with respect to the roller; and means for centering the roller relative to the fitting, said means for linking in rotation the fitting and the roller and for axially retaining the fitting with respect to the roller being separate and independent of the means for centering the roller relative to the fitting and being able to compensate the differential thermal expansion of the fitting with respect to the roller at said high temperature, wherein the means for linking in rotation the fitting and the roller for axially retaining the fitting with respect to the roller consist of a key fixed to the fitting and applied by elastic means to a surface on the end of the roller.

6. The roller assembly according to claim 5, wherein the key slides freely on a spindle.

7. The roller assembly of claim 5, wherein the surface has a width corresponding to that of the key.

8. A roller assembly according to claim 5, wherein the means for centring the roller relative to the fitting consist of longitudinal or radial bimetallic elements.

9. A roller assembly according to claim 5, wherein the means for centring the roller relative to the fitting consist of longitudinal or radial elastic elements.

10. A roller assembly for transporting articles at high temperatures, comprising:

a ceramic roller having a longitudinal spindle and two ends;

at least one generally cylindrical, metallic fitting mounted to at least one end of the roller, at least one end of the roller including a recess;

means for linking in rotation the fitting and the roller for axially retaining the fitting with respect to the roller; and means for centering the roller relative to the fitting, wherein the means for linking in rotation the fitting and the roller for axially retaining the fitting with respect to the roller are separate and independent of the means for centring the roller relative to the fitting, said means for linking being able to compensate the differential thermal expansion of the fitting with respect to the roller at said high temperatures, wherein the means for linking in rotation the fitting and the roller for axially retaining the fitting relative to the roller consist of a pin penetrating a recess in the end of the roller.

11. A roller assembly according to claim 10, wherein the means for centring the roller relative to the fitting consist of longitudinal or radial bimetallic elements.

12. A roller assembly according to claim 10, wherein the means for centring the roller relative to the fitting consist of longitudinal or radial elastic elements.

* * * * *